United States Patent [19]

Linam et al.

[11] 4,056,705
[45] Nov. 1, 1977

[54] APPARATUS FOR CONTROLLING THE WELDING PATTERN BETWEEN WELDMENT COMPONENTS

[75] Inventors: Richard L. Linam, League City, Tex.; Leonard J. Lucas, Richmond, Calif.

[73] Assignee: Kelso, Inc., Galveston, Tex.

[21] Appl. No.: 666,932

[22] Filed: Mar. 15, 1976

[51] Int. Cl.² .............................................. B23K 9/00
[52] U.S. Cl. ............................ 219/125 R; 219/131 R
[58] Field of Search ............ 219/124, 125 R, 125 PL, 219/131 R; 228/7, 102; 234/89

[56] References Cited

U.S. PATENT DOCUMENTS

| 3,109,921 | 11/1963 | Anderson | 234/89 |
| 3,246,544 | 4/1966 | Cooper | 234/89 |
| 3,657,511 | 4/1972 | Friedman et al. | 219/125 PL |
| 3,849,626 | 11/1974 | Linam et al. | 219/124 |

FOREIGN PATENT DOCUMENTS

| 2,436,047 | 3/1975 | Germany | 219/131 R |

Primary Examiner—J. V. Truhe
Assistant Examiner—Clifford C. Shaw
Attorney, Agent, or Firm—Jack W. Hayden

[57] ABSTRACT

An arrangement for actuating welding guns to weld weldment components in a predetermined welding pattern wherein the weldment components are movable relative to the welding guns. Movable means are movable in synchronism at a predetermined reduced speed in relation to the speed of the movable weldment components with means on the movable means corresponding with the desired welding pattern to be formed on the weldment components. Scanner means are electrically connected to the welding guns and are responsive to the indicating means to sequentially activate and deactivate the welding guns to weld the weldment components and form the predetermined welding patterns thereon. Limit switch means are electrically connected to the welding guns and means are provided on the movable means to actuate the limit switch means when the weldment components have completed their movement relative to welding guns to deactivate the welding guns.

3 Claims, 6 Drawing Figures

APPARATUS FOR CONTROLLING THE WELDING PATTERN BETWEEN WELDMENT COMPONENTS

SUMMARY OF THE INVENTION

The closest prior art with which applicant is familiar is U.S. Pat. No. 3,849,626 of which applicant is coinventor. The present invention relates to an improvement over such patent for controlling welding guns to automatically turn them on and off at predetermined intervals as desired so that the welding guns may weld weldment components together in apredetermined pattern as they move horizontally relative to the welding guns.

Still another object of the present invention is to provide a welding pattern control apparatus so that when pairs of rows of welding guns are employed to weld between weldment components moving horizontally relative to the pair of rows of welding guns, the welding guns may be cycled so that the weld between the weldment components may be aligned relative to each other, or they may be offset or arranged in any other desired pattern.

In addition, the present invention by its arrangement actuates the welding guns of one row of a pair of rows of welding guns to turn them on for a predetermined interval and then to cut them off and to independently turn on the second row of welding guns for welding of weldment components moving relative to the pair of rows of welding guns and then turn off the second row of welding guns.

Yet a further object of the present invention is to correlate the horizontal movement of the weldment components to the means for actuating the welding guns so that the operation of the welding guns is related to the distance of movement of the weldment components even if the speed of movement varies, or if movement of the weldment components is completely stopped and then restarted.

Still another object of the present invention is to provide a relatively simple yet precise arrangement for controlling the welding pattern to be formed between weldment components.

Still another object of the present invention is to provide a relatively simple yet precise arrangement for controlling the welding pattern to be formed between weldment components and wherein the welding pattern may be readily varied as desired.

Other objects and advantages of the present invention will become apparent from consideration of the following description and drawings.

BRIEF DESCRIPTION OF THE PREFERRED EMBODIMENT

Figure 1:
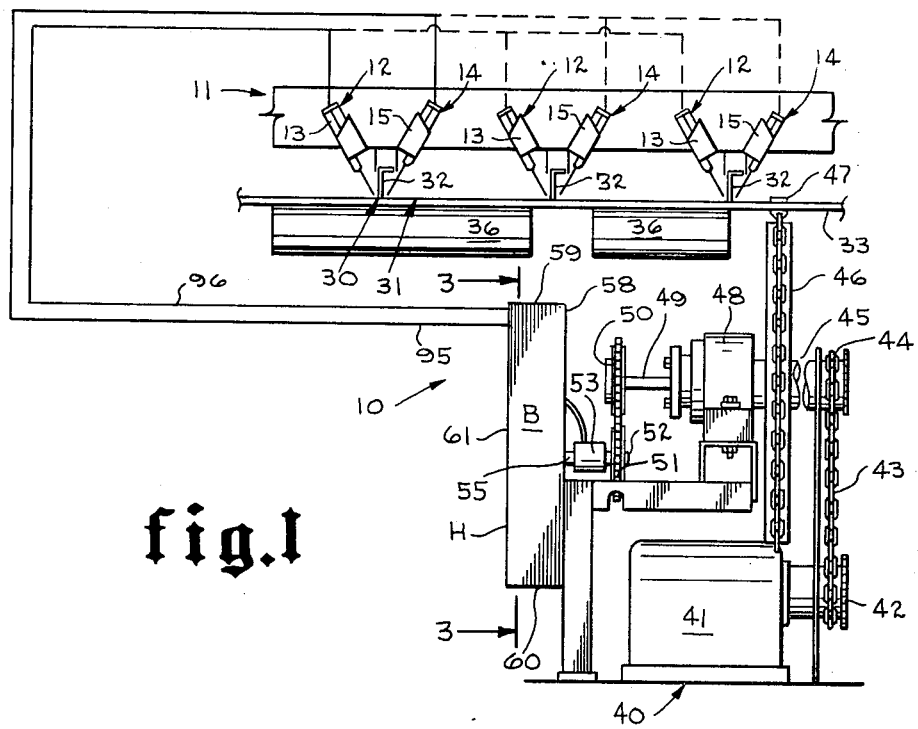
FIG. 1 is an end view partly in section diagrammatically illustrating a pair of rows of welding guns, one row being termed the front row and the other row being termed the second or rear row of welding guns such as shown and described in U.S. Pat. No. 3,650,457. Schematically illustrated are support means for holding vertical weldment components or members that are to be welded to a horizontal weldment component, means for simultaneously moving the weldment components relative to the rows of welding guns and means for synchronously moving the weldment components in relation to movable means to thereby correlate the cycle of operation of the welding guns with horizontal movement of the weldment components relative to the welding guns.

Attention is first directed to FIG. 1 of the drawings wherein the invention is referred to generally by the numeral 10. A first row 12 of welding guns 13 is diagrammatically illustrated as is a second row 14 of welding guns 15. This general structural arrangement of the welding guns is illustrated in U.S. Pat. No. 3,650,457.

Weldment components 30 and 31 comprising the laterally spaced vertical members 32 and horizontal member 33 are to be moved simultaneously relative to the first and second rows of welding guns 12 and 14 for welding the vertical stiffners 32 to the horizontal plate member 33. Suitable support means as schematically referred to at 11 are provided for retaining the vertical members 32 in a desired relationship relative to the horizontal weldment component 33 as the weld therebetween is effected as will be described hereinafter.

Suitable means as referred to at 40 are provided for moving the weldment components horizontally relative to the rows of welding guns and comprise the motor 41 connected by the sprocket 42 on the shaft thereof and chain 43 to the sprocket 44 which in turn rotates shaft 45 upon which longitudinally aligned and spaced sprockets 46 are mounted. The spaced sprockets 46 (only one of which is seen) include endless chain means thereon having retractable dogs or lugs 47 for engaging the end of the horizontal weldment 33 to propel it horizontally and relative to the first row 12 and second row 14 of welding guns. If desired suitable support means such as rollers 36 or the like may be provided for accommodating movement or conveying the weldment components through the apparatus.

The shaft 45 is supported by suitable bearing means 48, 48 also representing suitable gear reduction means. The shaft 49 is connected with the gear reduction means and is provided with a gear or sprocket 50 thereon. The sprocket 50 engages a gear or sprocket 51 carried on shaft 52 and the shaft 52 is also supported by clutch means 53 for selectively disengaging the shaft 52 and sprocket 51 from the shaft 55. The clutch means 53 is mounted on shaft means 55 adjacent one end thereof. The shaft 55 is rotatably supported in housing H by any suitable means and extends into such housing as shown in greater detail in FIGS. 3 and 4. The housing H is shown as being generally rectangularly shaped and having a back plate 58, a top plate 59, a bottom plate 60, with a front cover 61 pivotally secured to provide access to the interior of the housing.

Figure 4:
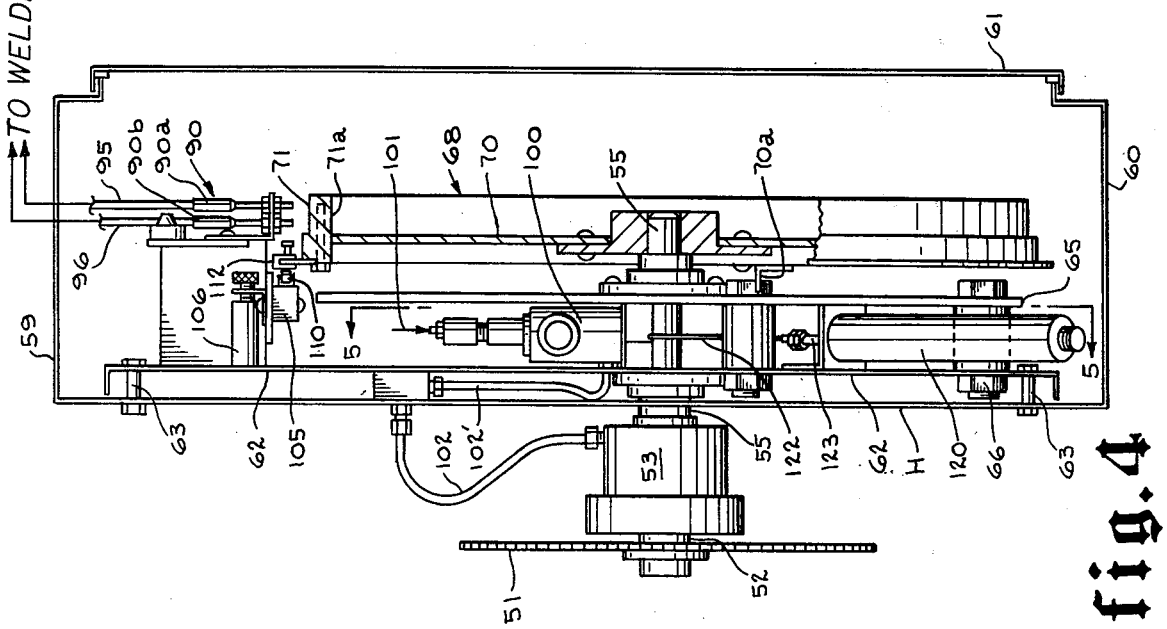
FIG. 4 is a sectional view, partly in elevation, on the line 4—4 of FIG. 3 to illustrate still additional details of the present invention.

A plate 62 is mounted on and spaced from the back plate 58 by suitable means such as the mounting screws 63 as shown in FIG. 4.

A second plate 65 is mounted by any suitable means such as shown at 66 on and spaced from the plate 62 as illustrated in FIG. 4 of the drawings. The shaft 55 extends through the plates 62 and 65 and is rotatably supported thereby by any suitable bearing means. Secured to the other end of the shaft 55 in the housing H is movable means referred to generally by the numeral 68. The movable means may be secured on the end of shaft 55 by any suitable means, and it will be noted that the movable means 68 is spaced from the plate 65 as shown in FIG. 4 of the drawings.

Figure 2:
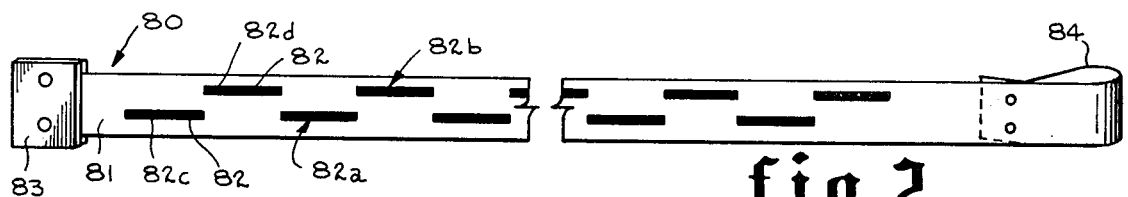
FIG. 2 illustrates a form of means employed with the movable means for indicating and controlling the desired welding pattern between the weldment components.

The movable means 68 is preferably in the form of a disc 70 having circumferential surface means 71 formed thereon for receiving any suitable means such as by way of example an indicating means, one form of which is referred to generally by the numeral 80 in FIG. 2 of the drawings.

It will be noted that the circumferential edge 72 of the disc 70 is marked off in any suitable scale and as illustrated such scale extends from 0 through 54 with each mark on the scale representing one linear foot of length of horizontal plate 33.

Scanner means referred to generally by the numeral 90 are mounted on the bracket 91 which bracket is secured to the plate 62 by any suitable means. In the form of the invention illustrated in the drawings, it will be noted that the scanner means 90 is shown as comprising two separate scanners 90a and 90b each of which is aligned with the circumferential surface means 71 on the disc 70 which supports the indicating means 80 and the scanner means 90a and 90b are each connected electrically with one of the rows of welding guns as represented at 95 and 96 for activation and deactivation thereof as will be described in greater detail hereinafter.

Figure 3:
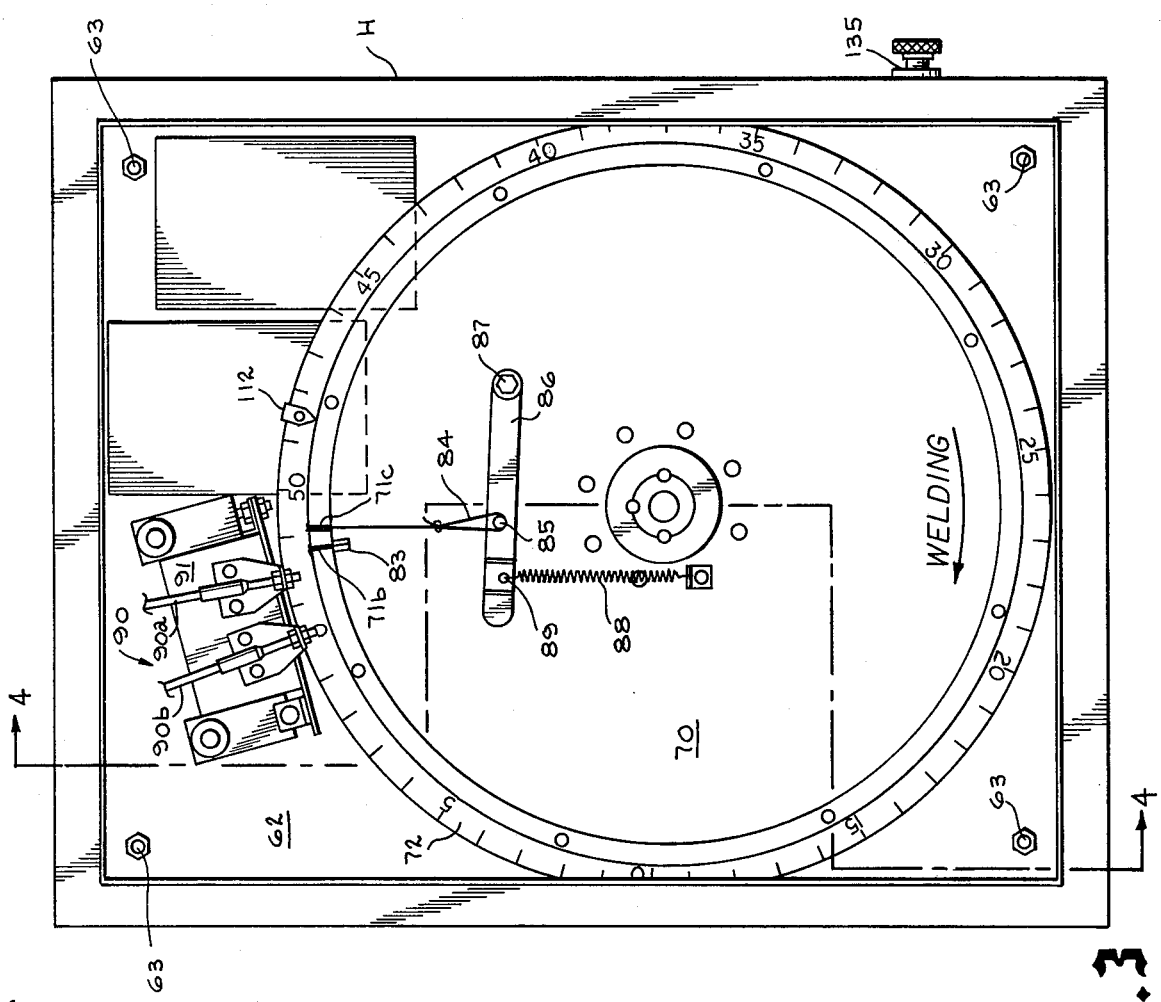
FIG. 3 is a sectional view, enlarged, on the line 3—3 of FIG. 1 and partly in elevation to illustrate in greater detail certain components of the present invention.

A clutch control valve 100 may be mounted in any suitable manner and is shown as being mounted between the plates 62 and 65 for controlling activation and deactivation of the clutch means 53. More specifically, the clutch means 53 in the form of the invention shown in the drawings, by way of example only is an air actuated clutch and air from a suitable source under pressure is conducted to and maintained on the clutch control valve 100 from a suitable conduit as represented by the arrow at 101. The clutch control valve 100 may be of any type, by way of example, a solenoid operated valve, which is normally closed and is electrically connected with a start button mounted anywhere on the housing for activation thereof when the start button activates the entire apparatus. The control valve 100 is also electrically connected with the switch means 105 for a purpose as will be described in greater detail hereinafter. The switch means 105 is shown as being mounted by the bracket 106 on the plate 62 and is provided with a roller contact 110 against which the adjustable clip means 112 positioned on the circumferential edge of the disc 70 as shown in FIGS. 3 and 4 engages to thus activate control valve 100 as will be described.

It will be noted that a suitable air conduit is connected with the discharge of the air control valve as illustrated at 102 for conducting air from the control valve 100. When the control valve is activated air is conducted through conduit 102 to the clutch 53 to rotatably engage the shaft 55 with shaft 52 and rotating sprocket 51 carried on shaft 52.

Figures 5, 6:
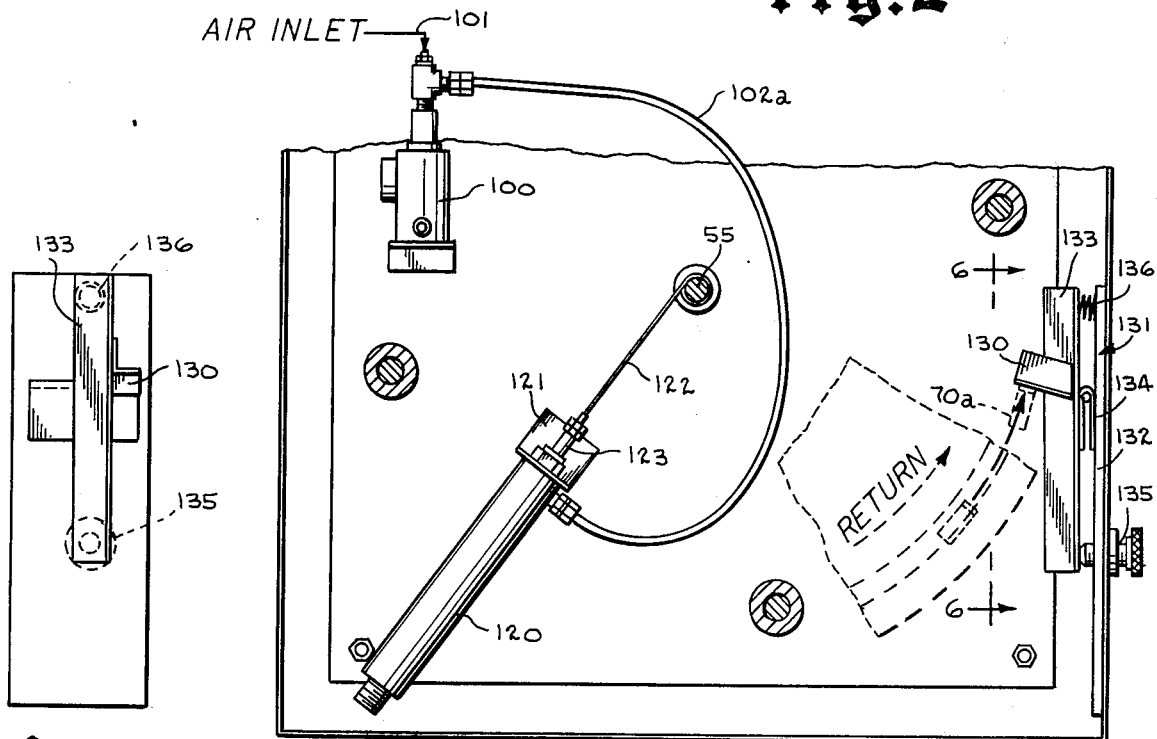
FIG. 5 is a partial sectional view on the line 5—5 of FIG. 4 to illustrate the relationship of an air control valve and the means which tends to return the disc means to a predetermined position.
FIG. 6 is a view on the line 6—6 of FIG. 5 which illustrates stop means for the disc or movable means, as well as an adjustment arrangement for the stop means.

Pneumatic piston and cylinder means 120 is mounted by bracket 121 on plate 62 and a flexible line 122 is connected at one end to piston rod 123 extending from the cylinder and flexible line 122 is connected at its other end to shaft 55 as shown in FIGS. 4 and 5 of the drawings. The piston and cylinder 120 and flexible line 122 provide a means to rotate the disc 70 to return it to a predetermined position when the switch means 105 has been actuated by the clip 112 as will be described in greater detail.

The indicating means 80 may be of any suitable form and as illustrated comprises a tape 81 upon which markings 82 are provided or arranged to correspond with the desired welding pattern to be applied to the weldment components 32 and 33. The end 83 of the tape 81 is provided with a stop means and the end 84 is in the form of a loop. When the tape 81 is initially placed on the surface means 71, the stop 83 is positioned beneath the annular edge 71a of surface 71 and the tape then extended through a slot 71b in the annular edge 71a and surface 71 as shown in FIG. 3 of the drawings. The tape is then wrapped circumferentially about the circumferential surface means 71 of the disc 70 and is extended through the slot 71c so that the loop 84 may be engaged over the extension 85 on the rod 86. The rod 86 has one end pivotally secured as shown at 87 to the disc 70 and a coil spring 88 is secured at one of its ends to the disc by suitable means as shown with the other end 89 engaging the rod 86 and tending to pull on the rod 86 to retain the tape 81 taut on the support surface means 71 to retain it in position during operation of the invention.

As previously noted the scanner means 90 is aligned with the surface means 71, and includes the two scanners 90a and 90b which may be of any suitable type. With the indicating means illustrated, the scanners 90a and 90b are optical scanners. They are offset so that all of the indications or markings 82 on the tape 81 can be optically scanned. As a practical matter, the optical scanner 90b will scan the row 82a of markings and the optical scanner 90a will scan the row referred to generally at 82b of optical markings on the tape 81.

It should be further noted that not only are the optical scanners 90a and 90b offset laterally, but they are also offset longitudinally a predetermined distance depending upon the longitudinal distance between the welding guns 13 in row 12 and welding guns 15 in row 14 as well as the amount of relative reduction in speed between the weldment components 32, 33 and movable means or disc 70. By way of example only, if the gear reduction means 48 is in a ratio of ten to one, that is if the weldment components 32, 33 are moving ten times as fast as the peripheral surface 71 of the movable means or disc 70 and if the longitudinal distance between row 12 and row 14 of welding guns is 16 inches, then the distance between optical scanner 90a and 90b is 1.6 inches. Thus, the scanner means 90 comprising the optical scanners 90a and 90b are spaced from each other by the formula:

$$\frac{\text{speed of weldment components}}{\text{peripheral surface speed of movable means}}$$

$$= \frac{\text{length of space between rows of welding guns}}{\text{length of space between scanner means}}$$

Suitable means are provided for stopping the disc 70 in a predetermined position, such stop means including a brackt 70a secured to the disc which stop means is adapted to abut the surface means 130 carried by the support means 131 positioned in the housing H adjacent the disc. The support means includes longitudinally extending rod 132 which is connected to an L-shaped bracket 133 by means of the hinge 134 secured therebetween as shown in FIG. 5 of the drawings. In addition a coil spring 136 is also positioned between the L-shaped bracket 133 and the rod 132 at one end while at the other end an adjustment screw 135 is threadedly secured through the housing H and rod 132 and abuts the L-shaped angle 133 adjacent one end thereof. It can be appreciated by reason of the angular relationship of the surface means 130 and by reason of the foregoing structure, the surface means 130 may be adjusted slightly so that the disc 70 may be always zeroed or returned to a predetermined position after each welding operation.

When it is desired to employ the present invention, the weldment components including the horizontal plate 33 and the vertical stiffeners 32 are positioned on the support as described in U.S. Pat. No. 3,650,457. The motor 41 is started by pressing the start button or by an other suitable means. At such time this also actuates the entire electrical and air system of the present invention. The motor 41 supplies power to move the plate 33 and stiffeners 32 horizontally relative to the rows 12 and 14 of welding guns. By reason of the gear reduction 48, the disc means 70 is rotated synchronously with the weldment components. The scanners 90b and 90a scan the rows 82a and 82b respectively on tape 81. It will be noted that the markings 82 in the rows 82a and 82b on the tape 81 are staggered and thus the welding pattern formed between the vertical stiffeners 32 and the horizontal plate 33 will be staggered. It can also be appreciated that any other desired welding pattern may be formed between the weldment components 32 and 33 by changing the markings in the rows 82a and 82 b as desired.

For example, when the scanner 90b is aligned with the first black marking 82c in the row 82a, this will activate the first row of welding guns 12 and they will remain on as long as the scanner scans the first black mark 82c on the tape 81. When it reaches the end of such marking the scanner will deactivate the welding guns 13 in row 12 and the plate 33 and vertical stiffeners 32 will continue their movement relative to the spaced rows of welding guns. By reason of the relationship of the scanners 90a and 90b to each other as determined in the manner heretofore described, the scanner 90a will then next scan the marking 82d which is the first marking in the row 82b and thus activate the welding guns 15 in the row 14 of the tape 81. The welding guns 15 in row 14 will all remain on so long as scanner 90a is aligned with marking 82d and will shut off when the end of the marking is reached.

Thus, the disc 70 forms a movable means which is movable in synchronism with and at a predetermined reduced speed in relation to the speed of the movable weldment components 30 and 31 to effect the desired welding pattern. The indicating means formed by the markings on tape 81 which are optically scanned by the scanner means 90 correspond with the welding pattern to be formed on the weldment components 30 and 31 and since the scanner means 90 is electrically connected to the welding guns, the welding guns in each row are responsive to the indicating means 80 and sequentially activate and deactivate to form the welding pattern on the weldment components 30 and 31 in accordance with the pattern formed on the tape 81.

The clip 112, prior to starting the operation of the present invention will be positioned on the circumferential edge of the disc 70 to correspond with the length of the horizontal plate 33. As illustrated in FIG. 3, each of the markings on the edge 72 represent one foot and it will be noted that the clip 112 is positioned at the circumferential edge to represent a length of plate 33 of 48½ feet. The disc 70 will rotate in a clockwise direction as indicated by the arrow in FIG. 3 and when the full length of the weldment components 30 and 31 have moved horizontally past the rows of welding guns 12 and 14, the clip 112 engages the roller contact 110 of microswitch 105, and the solenoid clutch control valve 100 is deactuated to allow the disc 70 to return to its zero index position ready for the next weldment components. The microswitch 105 also causes the welding guns 13 and 15 to be turned off until the start button is actuated for the weldment. As previously noted, air is continuously supplied from an air source as represented by the air inlet line 101 to the clutch control valve 100, and the clutch control valve is of any suitable form such as a solenoid actuated valve normally in a closed position to prevent supply of air to the air clutch 53; however, when the motor 41 is started so as to move the weldment components 30 and 31 relative to the rows of welding guns, an electrical impulse is also relayed to the clutch control valve 100 to open it to permit air to flow through the line 102 and to the clutch means 53 so as to operatively engage shafts 52 and 55, and thus impart rotation to the disc 70. By reason of the gear reduction 48, the disc 70 moves in synchronism with the weldment components 30 and 31 as hereinbefore described.

It can be appreciated that air is supplied through conduit 102a to the air piston and cylinder 120 at all times. As the shaft 55 rotates along with the disc 70 the flexible line 122 is wrapped around the shaft 55, since the air pressure is not sufficient to restrain rotation of the shaft 55 but merely maintains the flexible line 122 taut. When the weldment components have completed their traverse or travel relative to the rows of guns and the microswitch 105 is activated, the shaft 55 is released from shaft 52 and the energy stored up in the piston and cylinder arrangement 120 by reason of the piston having moved against the pressure in line 102a, causes the piston to retract within the cylinder thus unwinding flexible line 122 and returning disc 70 to its predetermined or initial zero position. When it is in its predetermined or initial position, the stop 70a on the back thereof abuts the surface 130 as diagrammatically illustrated in FIG. 5 of the drawings. The surface 130 may be adjusted slightly by reason of the screw 135 and the spring arrangement described heretofore to assure that disc 70 is in zero position at the beginning of each operation.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for selectively actuating longitudinally spaced rows of welding guns to weld weldment components in a predetermined welding pattern, the weldment components being movable relative to the rows of welding guns comprising:

a. disc means supported on a shaft and rotatable from an initial predetermined position in synchronism at a predetermined reduced speed in relation to the speed of the movable weldment components;

b. circumferential surface indicating means on said disc means corresponding with the weld pattern to be formed on the weldment components;

c. optical scanner means electrically connected to each row of the welding guns and responsive to said surface indicating means to sequentially activate and deactivate the rows of welding guns to form the weld pattern on the weldment components;

d. said scanner means being longitudinally spaced from each other by the following formula:

$$\frac{\text{speed of weldment components}}{\text{peripheral surface speed of disc means}} = \frac{\text{length of space between rows of welding guns}}{\text{length of space between scanner means}}$$

e. air clutch means operable when activated to engage said disc means for rotation in synchronism relative to the movement of the weldment components and operable when deactivated to disengage said disc means from rotation in synchronism relative to the movement of the weldment components;

f. solenoid actuated control valve means actuatable for controlling the flow of air to said air clutch means to activate and deactive it, said control valve means being closed to deactivate said clutch means;

g. means electrically connected to said control valve means to actuate it when movement of said weldment components relative to the rows of welding guns is initiated to activate said clutch means and initiate synchronous rotation of said disc means;

h. switch means electrically connected with said solenoid actuated control valve means;

i. means on said rotatable disc means engagable with said switch means upon rotation of said disc means as the weldment components complete their movement relative to the rows of welding guns to actuate said control valve means and thereby deactivate said clutch means; and j. means to rotatably return said disc means to its initial predetermined position.

2. The invention of claim 1 including:

a. stop means to stop said disc means upon return to its initial predetermined position, said stop means including:

1. bracket means on said disc means;

2. support means adjacent said disc means;

3. surface means on said support means for abutting said bracket means thereagainst; and 4. cooperating means on said support and surface means for adjusting the position of said surface means to enable said disc means to be in said initial predetermined position when said bracket means and support means are abutting.

3. The invention of claim 1 wherein said means to rotatably return said disc means to the initial predetermined position includes:

a. one-way acting piston and cylinder means mounted adjacent said disc means;

b. flexible line means connected to said piston and to said shaft on which said disc means is supported; and c. conduit means for supplying air from an air pressure source to one side of said piston in a manner to cause said flexible line means to wrap around said shaft as said disc means is rotated by said clutch means in synchronism with the weldment components, and the air pressure acting to move the piston and unwrap the flexible line to cause rotation of the shaft and disc means thereon to the initial predetermined position when said disc means engages said switch means as the welding components complete their movement relative to the welding guns which deactivates said clutch means.

* * * * *